(12) United States Patent
Hatano

(10) Patent No.: US 10,705,726 B2
(45) Date of Patent: Jul. 7, 2020

(54) ELECTRONIC DEVICE, WEARABLE DEVICE, AND CHARACTER INPUT CONTROL METHOD

(71) Applicant: Toshiba Client Solutions CO., LTD., Koto-ku, Tokyo (JP)

(72) Inventor: Ryo Hatano, Kodaira Tokyo (JP)

(73) Assignee: Toshiba Client Solutions CO., LTD., Tokyo (JP)

( * ) Notice: Subject to any disclaimer, the term of this patent is extended or adjusted under 35 U.S.C. 154(b) by 0 days.

(21) Appl. No.: 16/108,806

(22) Filed: Aug. 22, 2018

(65) Prior Publication Data
US 2019/0235746 A1    Aug. 1, 2019

(30) Foreign Application Priority Data

Jan. 31, 2018 (JP) ................................. 2018-014664

(51) Int. Cl.
*G06F 3/0488* (2013.01)
*G06F 21/31* (2013.01)
*G06F 3/0354* (2013.01)
*G06F 3/01* (2006.01)

(52) U.S. Cl.
CPC .......... *G06F 3/04883* (2013.01); *G06F 3/011* (2013.01); *G06F 3/03547* (2013.01); *G06F 3/04886* (2013.01); *G06F 21/31* (2013.01)

(58) Field of Classification Search
CPC .. G06F 3/04883; G06F 3/011; G06F 3/03547; G06F 3/04886; G06F 21/31
See application file for complete search history.

(56) References Cited

U.S. PATENT DOCUMENTS

| 2007/0209016 | A1 | 9/2007 | Takayama et al. |
| 2007/0296704 | A1* | 12/2007 | Park ...................... G06F 3/0362 345/169 |
| 2014/0361997 | A1* | 12/2014 | Wen .................... G06F 3/04883 345/173 |
| 2018/0067557 | A1* | 3/2018 | Robert ................... G06F 3/016 |
| 2018/0375669 | A1* | 12/2018 | Abel ....................... G06F 21/31 |

FOREIGN PATENT DOCUMENTS

| JP | 2004-126973 A | 4/2004 |
| JP | 2005-174023 A | 6/2005 |
| JP | 2007-199882 A | 8/2007 |
| JP | 2014-212419 A | 11/2014 |

* cited by examiner

*Primary Examiner* — Ajay M Bhatia
*Assistant Examiner* — Mong-Shune Chung
(74) *Attorney, Agent, or Firm* — Knobbe, Martens, Olson & Bear, LLP

(57) ABSTRACT

According to one embodiment, an electronic device includes a character input controller. The character input controller displays a software keyboard including a set of input areas. Each input area of the set includes objects each representing a character. The set of input areas is arranged adjacent to one another in a first direction. The character input controller moves an active input area in the first direction or in a second direction opposite to the first direction, in response to a first operation or a second operation, and changes a character of an active object displayed in the active input area into another character in the active input area, in response to a third operation or a fourth operation.

8 Claims, 10 Drawing Sheets

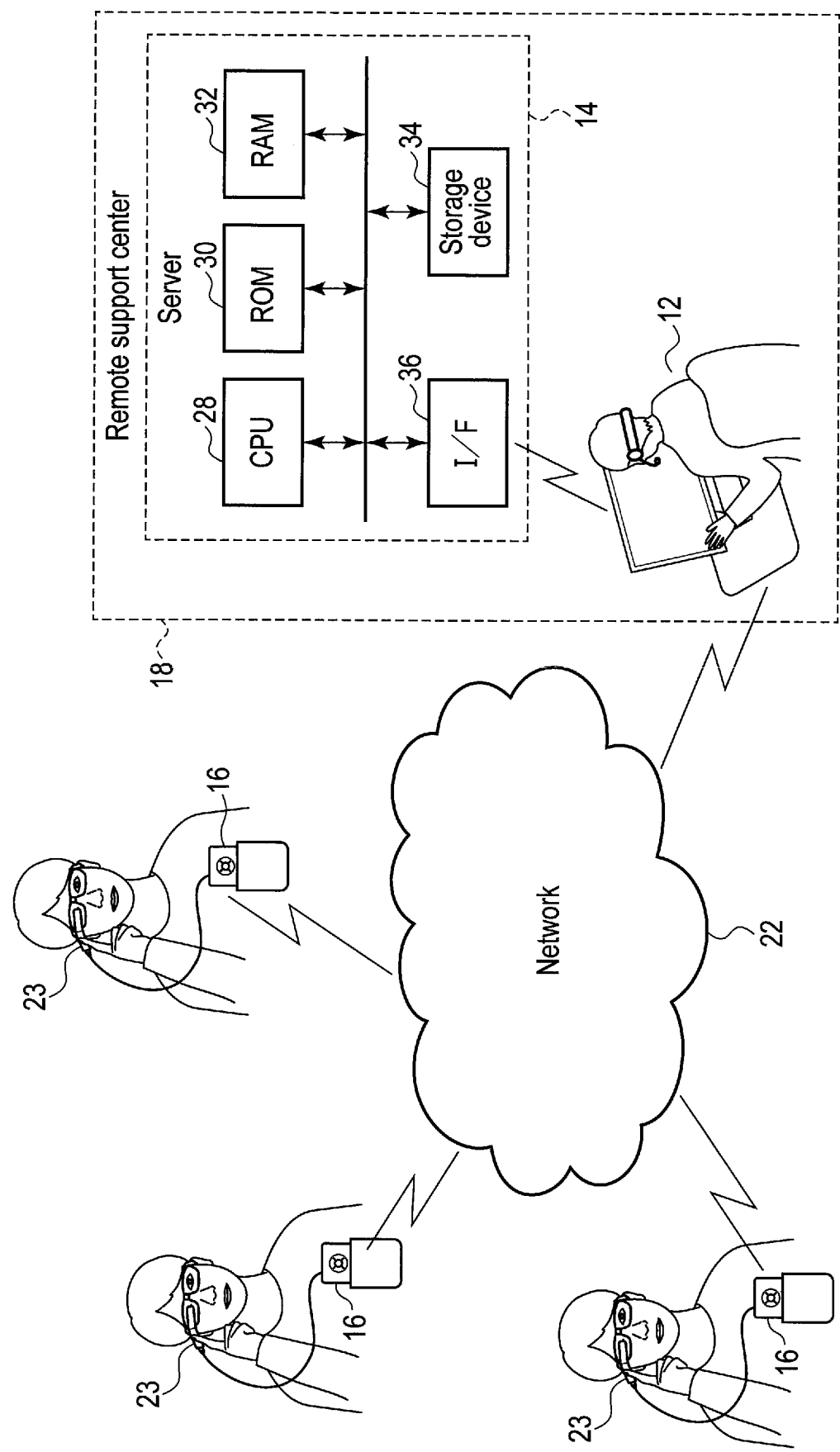
F I G. 1

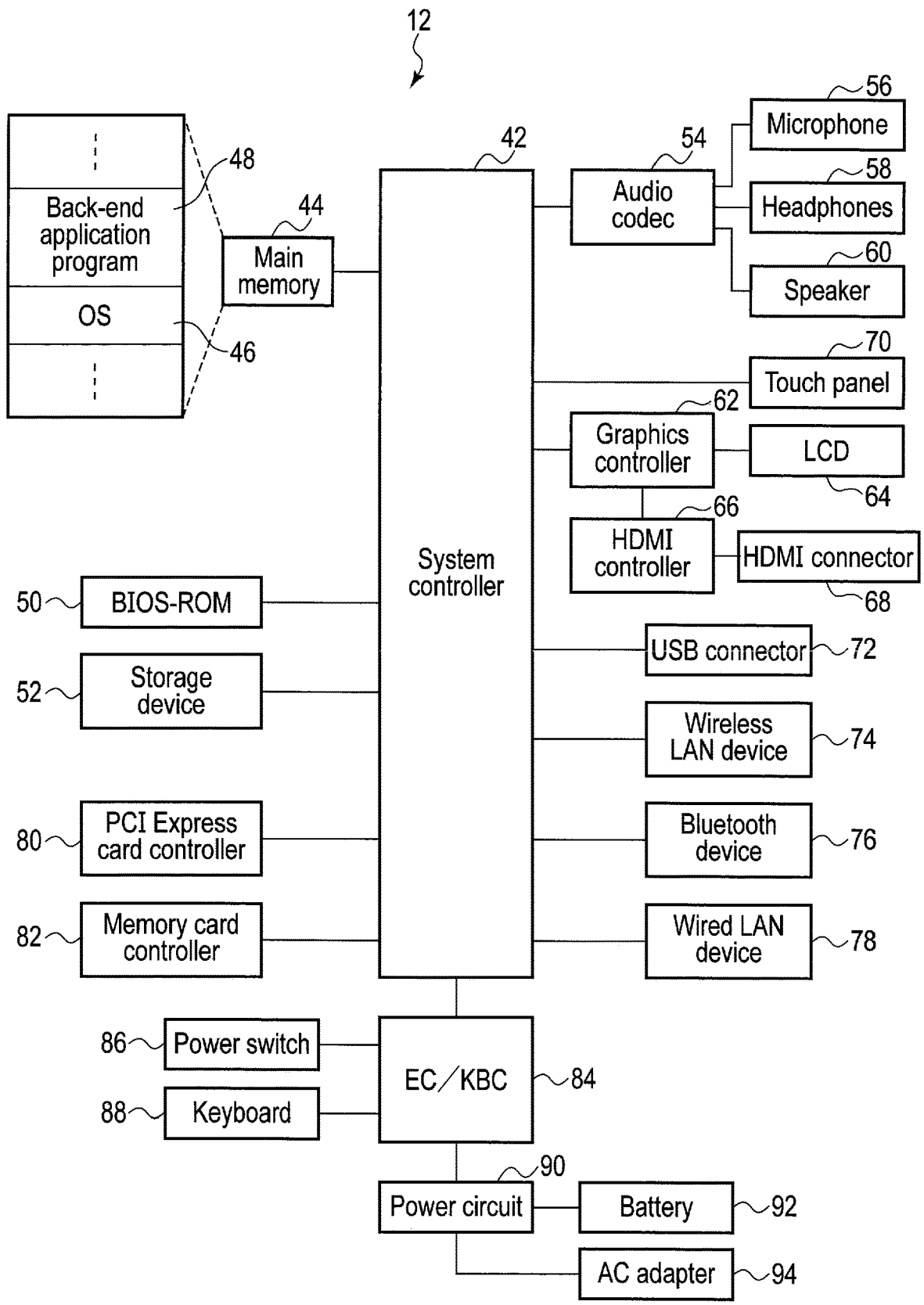
F I G. 2

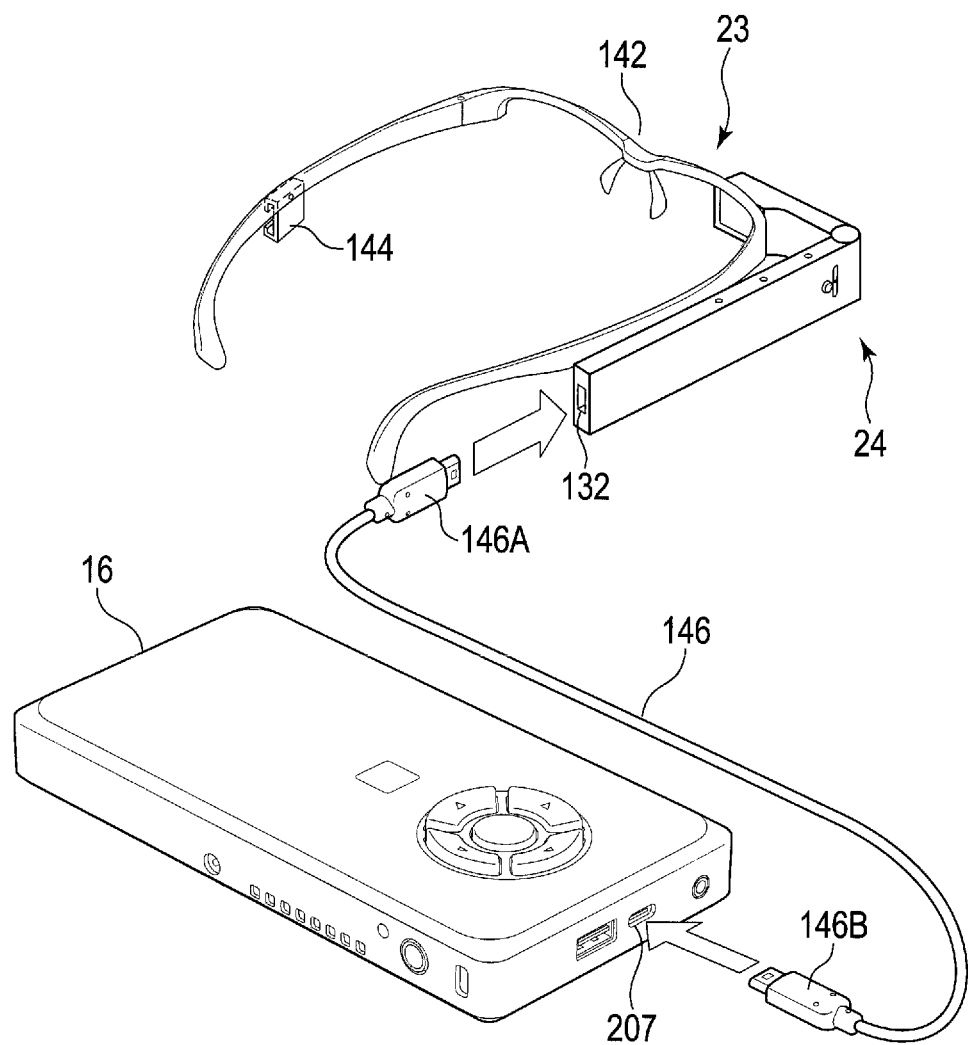
F I G. 5

ELECTRONIC DEVICE, WEARABLE DEVICE, AND CHARACTER INPUT CONTROL METHOD

CROSS-REFERENCE TO RELATED APPLICATIONS

This application is based upon and claims the benefit of priority from Japanese Patent Application No. 2018-014664, filed Jan. 31, 2018, the entire contents of which are incorporated herein by reference.

FIELD

Embodiments described herein relate generally to an electronic device, a wearable device, and a character input control method.

BACKGROUND

Recently, an IoT (Internet of Things) age in which many things are connected through the Internet has come. A technique called "edge computing" is required as a tool for network communication and information sharing in offices, factories, and in other various situations. In order to realize the edge computing, development of a practical mobile edge computing device having high degrees of versatility and processing capacity and can be used by a worker (user) on site is needed separately from a data center (or cloud). Thereby, it is expected that promotion of the operational efficiency and productivity improvement at a workplace and the like or load dispersion of data and improvement or the like in a network environment will be achieved.

In addition, conventionally, a mobile device such as a mobile phone terminal, a smartphone, or a mobile game player may require the user to enter the password. Because of the lack of full keyboard for practical reasons, a mobile device may present difficulties in inputting a character string, such as a password, smoothly using a small number of buttons.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an example block diagram of a remote assistance system including electronic devices according to one embodiment of the present disclosure.

FIG. 2 is an example block diagram of an operator terminal illustrated in FIG. 1.

FIG. 5 is a diagram illustrating an example connection configuration between the mobile PC and the wearable device body.

DETAILED DESCRIPTION

Figure 3:
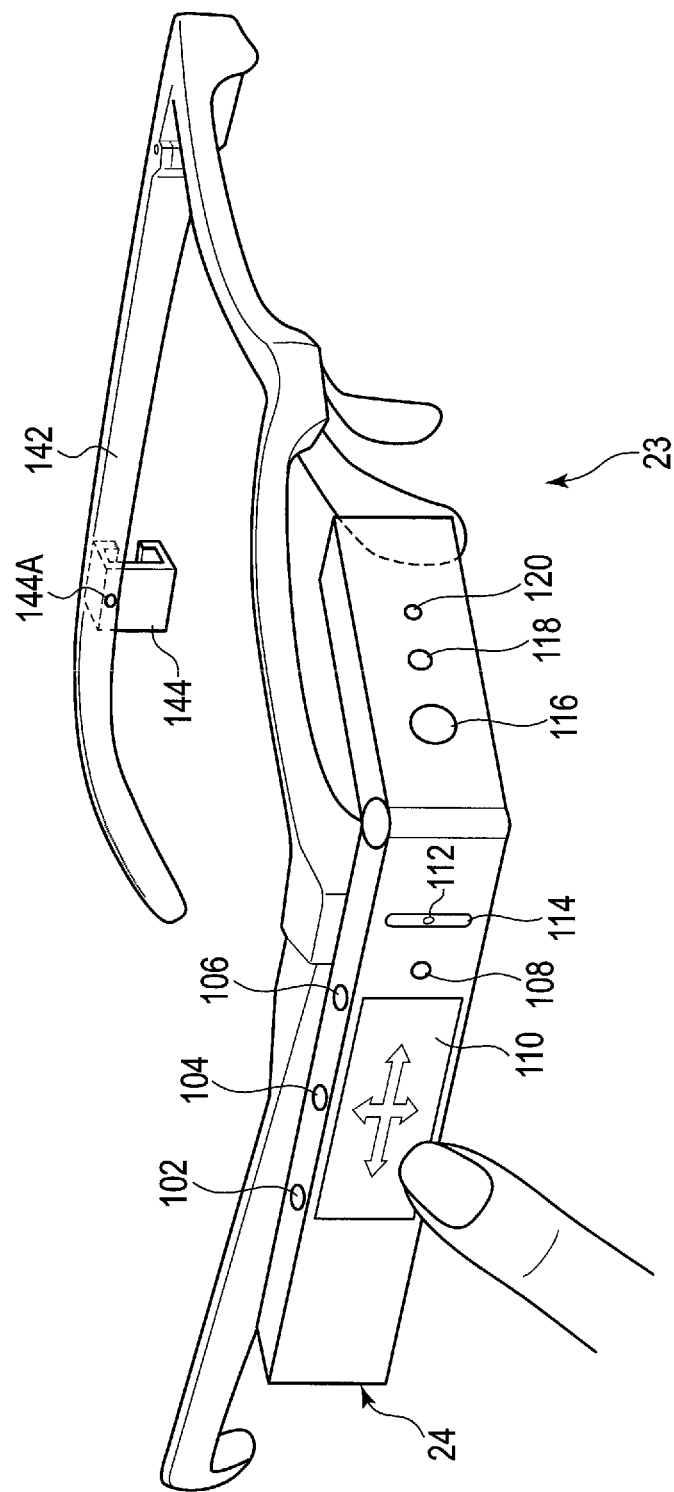
FIG. 3 is an example external view of a wearable device connected to a mobile PC illustrated in FIG. 1.

Various embodiments will be described hereinafter with reference to the accompanying drawings.

In general, according to one embodiment, an electronic device is connectable to a wearable device including a display. The electronic device includes an operation device and a character input controller. The character input controller displays a software keyboard on the display, and controls input of a character in response to an operation for the software keyboard using the operation device. The software keyboard comprises a set of input areas. Each input area of the set comprises objects each representing a character. The set of input areas is arranged adjacent to one another in a first direction. The character input controller moves an active input area among the set of input areas in a first direction or in a second direction opposite to the first direction, in response to a first operation specifying the first direction or a second operation specifying the second direction. The character input controller changes a character of an active object displayed in the active input area into another character in the active input area, in response to a third operation specifying a third direction perpendicular to the first direction or a fourth operation specifying a fourth direction opposite to the third direction.

Embodiments of the present invention will be described below by referring to the accompanying drawings. The following disclosure is presented by way of example only, and is not intended to limit the scope of the invention by the description of the disclosure. Various modifications that will readily occur to those skilled in the art are indeed made without departing from the spirit or scope of the disclosure. For clearer explanation, the accompanying drawings may be illustrated schematically by changing size, shape, and the like of constituent components relative to the actual dimensions of the embodiments. The same reference numbers are given in some cases to the corresponding elements in the drawings, and the detailed description of such elements will not be repeated.

[Remote Support System]

FIG. 1 is a block diagram showing an example of a remote support system configured to realize edge computing. The remote support system is configured to be used by an operator at the rear to support a user, for example, a worker at a workplace from a remote place. Examples of work at the workplace include a complicated maintenance service, picking operation in a distribution warehouse, monitoring of a workplace, disaster relief/medical support, and the like. The worker side of the workplace is also called a front end, and the operator side at the rear is also called a back end. In the remote support system, a mobile personal computer (PC) (also called a mobile edge computing device in some cases) 16 carried by the worker and remote support center (data center) 18 located at a position distant from the worker are connected to each other through a network 22, such as the Internet, so that communication can be carried out between them. The mobile PC 16 and remote support center 18 may be connected to the network 22 through wired LAN cables or may be connected to the network 22 through a wireless LAN, Bluetooth (registered trade mark), and the like.

A wearable device 23 is connected to the mobile PC 16. Although FIG. 1 shows an example in which the wearable device 23 is connected to the mobile PC through a cable, the wearable device 23 may also be connected to the mobile PC 16 through a wireless LAN, Bluetooth or the like. The wearable device 23 is provided with a camera and display device. An image shot by the camera may be displayed on the display device. An image shot by the camera may be transmitted to the mobile PC 16, and the image transmitted from the mobile PC 16 may be displayed on the display device.

As shown in FIG. 1, it is also possible for a plurality of workers to communicate with each other through the network. In this case, communication may also be carried out through the remote support center 18, and communication can also be carried out only between the workers without leing carried out through the operator of the remote support center 18.

The remote support center 18 is provided with an operator terminal 12 and server 14. The remote support center 18 makes a voice call or information exchange between the mobile PC 16 (and wearable device 23) and operator terminal 12. It is possible to carry out video distribution of a real-time image shot by the wearable device 23 connected to the mobile PC 16 to the operator terminal 12, and it is also possible to carry out mutual transmission/reception of an image between the mobile PC 16 and operator terminal 12. Further, it is also possible to transmit a text message from the operator terminal 12 to the mobile PC 16. For example, in the picking operation in the distribution warehouse, a place of a picking item is displayed on the wearable device 23, whereby hands-free picking can be realized.

The remote support typically include, for example, the following functions:

A voice call function of carrying out an interactive voice call between the mobile PC 16 and operator terminal 12;

A live image distribution function of carrying out video distribution of a real-time image shot by the wearable device 23 to the operator terminal 12 during a voice call;

A function of carrying out transmission/reception of a still image between the mobile PC 16 and operator terminal 12 during a voice call (The mobile PC 16 transmits a shot still image or capture image being video-distributed to the operator terminal 12. The operator terminal 12 edits the received picture by writing characters or pictures, and transmits the edited image to the mobile PC 16. The still image received by the mobile PC 16 is stored in a folder in the mobile PC 16, and can browsed);

A screen sharing function of displaying the entire desktop screen of the operator terminal 12 or a window of an arbitrary application program on the wearable device 23 during a voice call; and A text message transmitting function of transmitting a text message from the operator terminal 12 to the mobile PC 16.

The server 14 is configured to carry out processing for remote support in place of or in cooperation with the operator terminal 12, and is provided with a processor (CPU) 28, ROM 30, RAM 32, and a storage device 34 constituted of a hard disk drive (HDD) or solid-state drive (SSD), and interface 36. The operator terminal 12 may be made to have all the functions of the server 14, and the server 14 may be omitted.

[Operator Terminal 12]

FIG. 2 is a block diagram showing an exemplary structure of the operator terminal 12. The operator terminal 12 is constituted of a desktop PC, notebook PC or the like.

The operator issues an instruction to the worker having the mobile PC 16 by a conversation or image while confirming the situation of the workplace on the basis of a real-time image by using the operator terminal 12. The operator can write pictures or characters to the image file received from the mobile PC 16 by using the operator terminal 12 to edit the image file, transmit the edited image file to the mobile PC 16, and store the edited image file in the operator terminal 12.

The operator terminal 12 is provided with a system controller 42 including a processor. A main memory 44, BIOS-ROM 50, a storage device 52 constituted of HDD or SSD, audio codec 54, graphics controller 62, touch panel 70, USB (registered trade mark) connector 72, wireless LAN device 74, Bluetooth device 76, wired LAN device 78, PCI Express (registered trade mark) card controller 80, memory card controller 82, embedded controller/keyboard controller (EC/KBC) 84, and the like are connected to the system controller 42.

The system controller 42 executes various programs to be loaded from the storage device 52 into the main memory 44. These programs include an operating system (OS) 46, and back-end application program 48 for remote support. The system controller 42 also executes the Basic Input/Output System (BIOS) stored in the BIOS-ROM 50 which is a nonvolatile memory. The BIOS is a system program for hardware control.

The audio codec 54 converts a digital audio signal which is an object to be reproduced into an analog audio signal, and supplies the converted analog audio signal to headphones 58 or a speaker 60. Further, the audio codec 54 converts an analog audio signal input thereto from a microphone 56 into a digital signal. The microphone 56 and headphones 58 may be provided singly, and may also be provided in an integrated manner as an intercom.

The graphics controller 62 controls a liquid crystal display (LCD) 64 to be used as a display monitor of the operator terminal 12. The touch panel 70 is overlaid on the screen of the LCD 64, and is configured in such a manner as to allow a handwriting input operation to be carried out on the screen of the LCD 64 by means of a touch-pen or the like. An HDMI (registered trade mark) controller 66 is also connected to the graphics controller 62. The HDMI controller 66 is connected to an HDMI connector 68 for connection to en external display device.

The wireless LAN device 74 executes wireless LAN communication of the IEEE802.11 standard for the purpose of connection to the network 22. The Bluetooth device 76 executes wireless communication of the Bluetooth standard for the purpose of connection to an external device. The wired-LAN device 78 executes wired LAN communication of the IEEE802. 3 standards for the purpose of connection to the network 22. As described above, the connection between the operator terminal 12 and network 22 may be made by wireless communication or may be made by wire communication.

The PCI Express card controller 80 carries out communication of the PCI Express standard between the operator terminal 12 and external device. The memory card controller 82 writes data to a storage medium, for example, a memory card such as an SD (Secure Digital) card (registered trade mark), and reads data from the memory card.

The EC/KBC 84 is a power management controller, and is realized as a one-chip microcomputer incorporating therein also a keyboard controller configured to control a keyboard 88. The EC/KBC 84 has a function of powering on or powering off the operator terminal 12 according to an operation of a power switch 86. Control of the power-on and power-off is executed by the cooperation between the EC/KBC 84 and a power circuit 90. Even while the operator terminal 12 is in the power-off state, the EC/KBC 84 operates by power from a battery 92 or AC adaptor 94. The power circuit 90 uses the power from the battery 92 or power from the AC adaptor 94 to be connected as an external electric power supply to generate the power to be supplied to each component.

[Wearable Device 23]

FIG. 3 shows an example of an external appearance of the wearable device 23 to be connected to the mobile PC 16. The wearable device 23 is provided with an eyeglass frame 142 and wearable device main body 24. The eyeglass frame 142 may have a shape obtained by removing lenses from general eyeglasses and is worn on the face of the worker. The eyeglass frame 142 may have a structure to which eyeglasses can be attached. When the worker habitually uses eyeglasses at all times, lenses of degrees identical to the habitually used eyeglasses may be attached to the eyeglass frame 142.

The eyeglass frame 142 is provided with mounting brackets 144 on both the right and left temples thereof. The wearable device main body 24 is attached to and detached from one of the mounting brackets 144 on the right or left temple. In FIG. 3, the mounting bracket 144 on the temple on the right side of the worker is hidden behind the wearable device main body 24, and hence is not shown. As described above, the wearable device main body 24 is provided with a display device 124 (shown in FIG. 4). The display device 124 is configured in such a way as to be viewed by one eye. Therefore, the mounting brackets 144 are provided on both the right and left temples so that the wearable device main body 24 can be attached to the mounting bracket on the dominant eye side. The wearable device main body 24 need not be detachably attached to the eyeglass frame 142 by means of the mounting bracket 144. The wearable devices 23 for the right eye and left eye in which the wearable device main bodies 24 are respectively fixed to the eyeglass frames 142 on the right and left frames may be prepared. Furthermore, the wearable device main body 24 may not be attached to the eyeglass frame 142, but may be attached to the head of the worker by using a helmet or goggle.

An engaging piece 128 (shown in FIG. 4) of the wearable device main body 24 is forced between upper and lower frames of the mounting bracket 144, whereby the wearable device main body 24 is attached to the eyeglass frame 142. When the wearable device main body 24 is to be detached from the eyeglass frame 142, the wearable device main body 24 is plucked out of the mounting bracket 144.

In a state where the wearable device main body 24 is attached to the mounting bracket 144, the engaging piece 128 is somewhat movable backward and forward in the mounting bracket 144. Accordingly, the wearable device main body 24 is adjustable in the front-back direction so that the worker's eye can be brought to a focus on the display device 124. Furthermore, the mounting bracket 144 is rotatable around an axis 144A perpendicular to the temple. After the wearable device main body 24 is attached to the eyeglass frame 142, the wearable device main body 24 is adjustable in the vertical direction so that the display device 124 can be positioned on the worker's line of sight. Moreover, the rotational angle of the mounting bracket 144 is about 90 degrees and, by largely rotating the mounting bracket 144 in the upward direction, the wearable device main body 24 can be flipped up from the eyeglass frame 142. Thereby, even when it is difficult to watch the real thing because the field of view is obstructed by the wearable device main body 24 or even when the wearable device main body 24 interferes with surrounding objects in a small space, it is possible to temporarily divert/restore the wearable device main body 24 from/to the field of view of the worker without detaching/reattaching the entire wearable device 23 from/to the face of the worker.

[Wearable Device Main Body 24]

The wearable device main body 24 is constituted of a side part to be along the temple of the eyeglass frame 142, and front part to be positioned on the line of sight of one eyeball of the worker. The angle which the front part forms with the side part is adjustable.

As shown in FIG. 3, on the outside surface of the front part, a camera 116, light 118, and camera LED 120 are provided. The light 118 is an auxiliary lighting fixture emitting light at the time of shooting a dark object. The camera LED 120 is configured to be turned on at the time of shooting a photograph or video to thereby cause the objective person to be photographed to recognize that he or she is to be photographed.

On the top surface of the side part of the wearable device main body 24 attached to the right side temple, first, second, and third buttons 102, 104, and 106 are provided. When the dominant eye of the worker is the left eye, the wearable device main body 24 is attached to the left side temple. The top and the bottom of the wearable device main body 24 are reversed according to whether the wearable main body 24 is attached to the right side temple or to the left side temple. Therefore, the first, second, and third buttons 102, 104, and 106 may be provided on both the top surface and undersurface of the side part.

On the outside surface of the side part, a touch pad 110, fourth button 108, microphone 112, and illuminance sensor 114 are provided. The touch pad 110 and fourth button 108 can be operated by a forefinger. When the wearable device main body 24 is attached to the right side temple, the buttons 102, 104, and 106 are arranged at positions at which the buttons 102, 104, and 106 can be operated by a forefinger, middle finger, and third finger, respectively. The touch pad 110 is configured such that the movement of finger in up and down directions or back and forth directions on the surface on the touch pad 110 as indicated by arrows can be detected. The movement to be detected includes flicking of a finger for grazing the surface quickly in addition to dragging of a finger for moving the finger with the finger kept in contact with the surface. Upon detection of up-and-down or back-and-force movement of the worker's finger, the touch pad 110 inputs a command. In this description, a command implies an executive instruction to execute specific processing to be issued to the wearable device main body 24. Operation procedures for the first to fourth buttons 102, 104, 106, and 108, and touch pad 110 are determined in advance by the application program.

For example, when the third button 106 is pressed once, item selection/item execution is carried out, when the third button 106 is pressed for a long time, a list of activated application programs is displayed, when the second button 104 is pressed once, the screen returns to the home screen, when the second button 104 is pressed for a long time, a menu of quick settings is displayed, and when the first button 102 is pressed once, cancellation (operation identical to the operation of the Esc key of the keyboard) of an operation is executed.

Regarding the operation of the touch pad 110, for example, when the touch pad 110 is dragged up and down, the cursor is moved lip and down, when the touch pad 110 is flicked forward (to the front of the head), the left icon is selected (continuously scrolled), when the touch pad 110 is flicked backward (to the back of the head), the right icon is selected (continuously scrolled), when the touch pad 110 is dragged forward, the left icon is selected (items are scrolled one by one), and when the touch pad 110 is dragged backward, the right icon is selected (items are scrolled one by one).

The first button 102 is arranged at such a position as to be operated by a forefinger, second button 104 at a position by a middle finger, third button 106 at a position by a third finger, and fourth button 108 at a position by a little finger. The reason why the fourth button 108 is provided not on the top surface of the side part, but on the outside surface of the side part in FIG. 3 is that there is space restriction. The fourth button 108 may also be provided on the top surface of the side part in the same manner as the first to third buttons 102, 104, and 106. The illuminance sensor 114 detects the illuminance of the surrounding area in order to automatically adjust the brightness of the display device.

Figure 4:
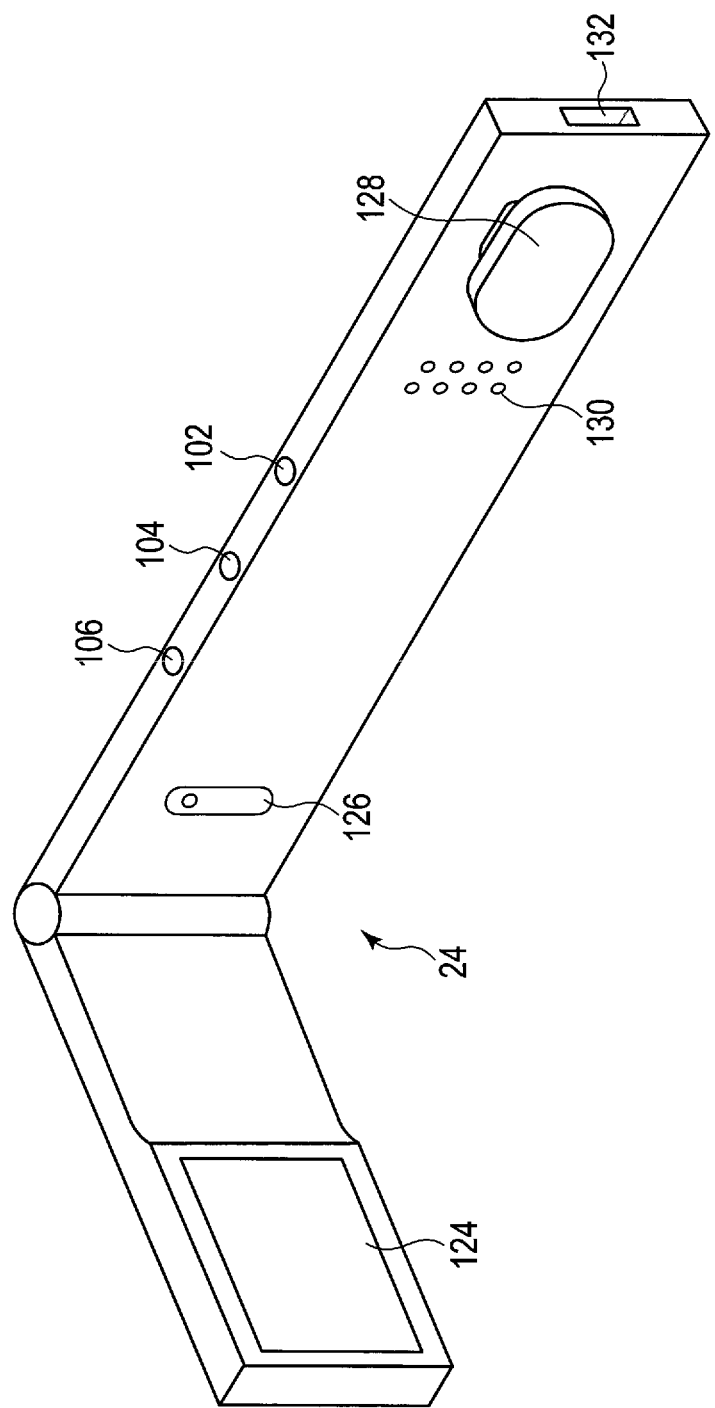
FIG. 4 is an example external view of a main body of the wearable device.

FIG. 4 shows an example of an external appearance of the back side of the wearable device main body 24. On the inner side of the front part, a display device 124 constituted of an LCD is provided. On the inner side of the side part, a microphone 126, speaker 130, and engaging piece 128 are provided. The microphone 126 is provided at a front position of the side part, and speaker 130 and engaging piece 128 at a rear position of the side part. Headphones may be used in place of the speaker 130. In this case, the microphone and headphones may also be provided in an integrated manner as an intercom in the same manner as the operator terminal 12.

FIG. 5 shows an example of connection between the mobile PC 16 and wearable device main body 24. At a rear position of the side part, a receptacle 132 into which a plug 146A at one end of a cable 146 conforming to the USB type-C (registered trade mark) standard is to be inserted is provided. A plug 146B at the other end of the USB type-C cable 146 is inserted into a connector 207 conforming to the USB type-C standard provided on an upper end face of the mobile PC 16. As described above, the wearable device main body 24 is connected to the mobile PC 16 through the USB type-C cable 146, and image signals and the like are transmitted from/to the wearable device main body 24 to/from the mobile PC 16 through the USB type-C cable 146. The wearable device main body 24 may also be connected to the mobile PC 16 by means of wireless communication such as a wireless LAN, Bluetooth, and the like.

In the embodiment, the wearable device main body 24 is not provided with a battery or DC terminal serving as a drive power supply, and the drive power is supplied from the mobile PC 16 to the wearable device main body 24 through the USB type-C cable 146. However, the wearable device main body 24 may also be provided with a drive power supply.

Figure 6:
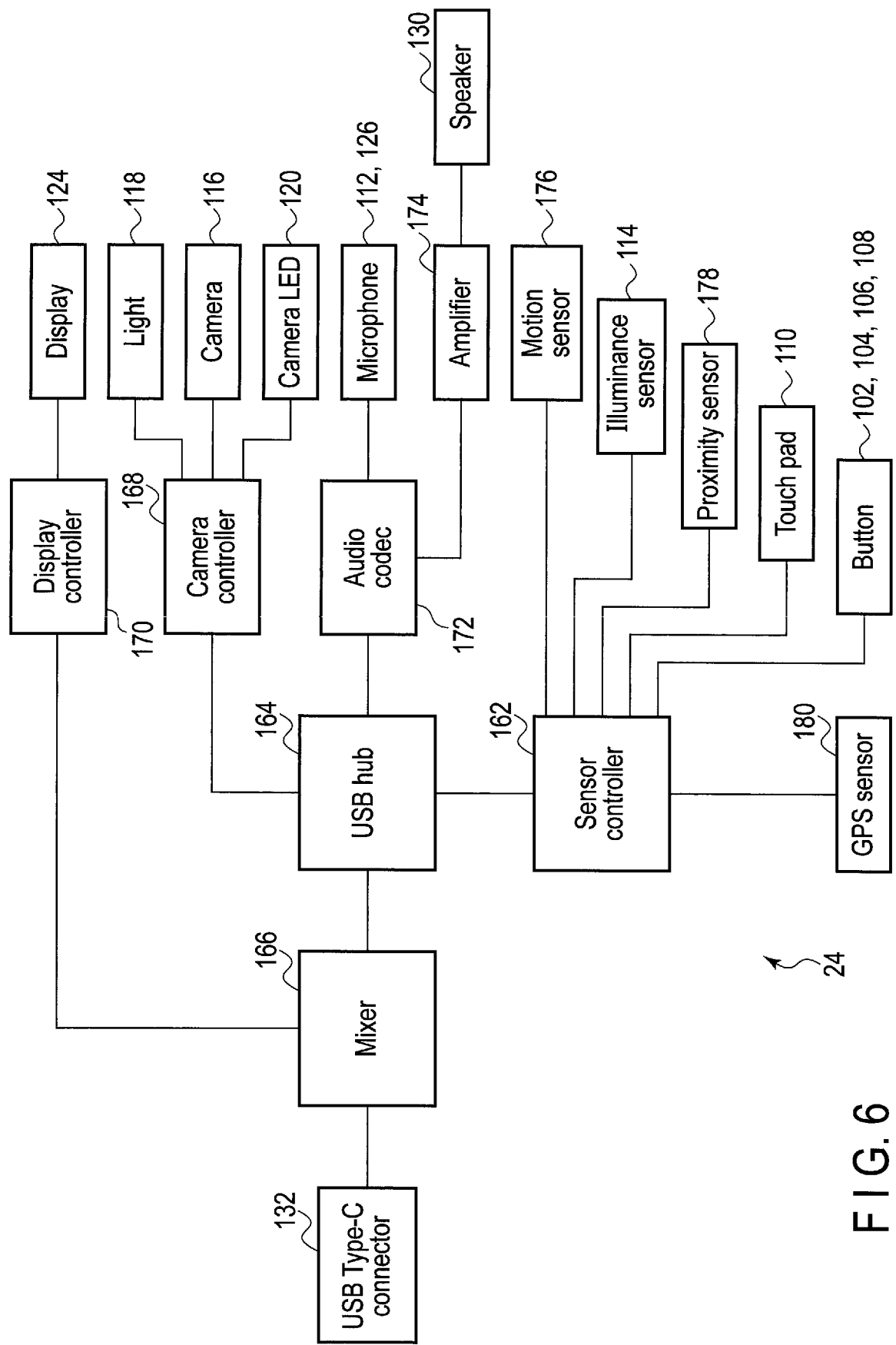
FIG. 6 is an example block diagram of the wearable device body.

FIG. 6 is a block diagram showing an exemplary structure of the wearable device main body 24. The USB type-C connector 132 is connected to a mixer 166. A display controller 170 and USB hub 164 are respectively connected to a first terminal, and second terminal of the mixer 16. The display device 124 is connected to the display controller 170. A camera controller 168, audio codec 172, and sensor controller 162 are connected to the USB hub 164. The camera 116, light 118, and camera LED 120 are connected to the camera controller 168. Audio signals from the microphones 112 and 126 are input to the audio codec 172, and audio signal from the audio codec 172 is input to the speaker 130 through an amplifier 174.

A motion sensor (for example, acceleration, geomagnetism, gravitation, gyroscopic sensor, etc.) 176, the illuminance sensor 114, a proximity sensor 178, the touch pad 110, the first to fourth buttons 102, 104, 106, and 108, and a GPS sensor 180 are connected to the sensor controller 162. The sensor controller 162 processes detection signals from the motion sensor 176, illuminance sensor 114, proximity sensor 178, touch pad 110, first to fourth buttons 102, 104, 106, and 108, and GPS sensor 180, and supplies a command to the mobile PC 16. Although not shown in FIG. 4, the motion sensor 176, and proximity sensor 178 are arranged inside the wearable device main body 24. The motion sensor 176 detects a motion, direction, attitude, and the like of the wearable device main body 24. The proximity sensor 178 detects attachment of the wearable device 23 on the basis of approach of a face, finger and the like of the worker thereto.

[Mobile PC 16]

Figure 7:
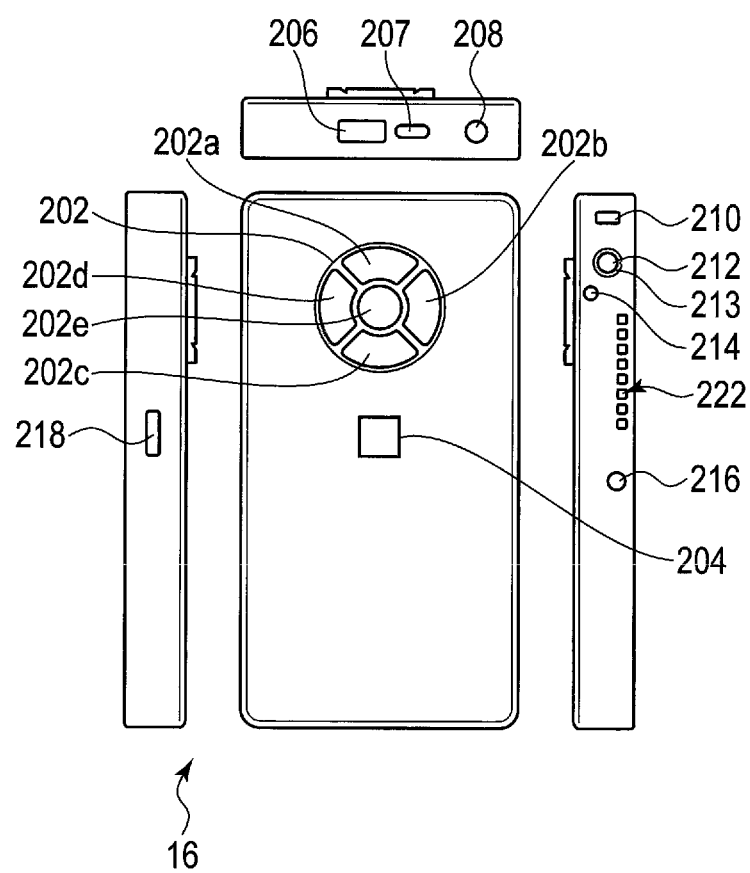
FIG. 7 is an example external view of the mobile PC.

FIG. 7 shows an example of an external appearance of the mobile PC (mobile edge computing device) 16. The mobile PC 16 is a small-sized PC that can be held by one hand, and has a small size and light weight, i.e., a width thereof is about 10 cm or less, height thereof is about 18 cm or less, thickness thereof is about 2 cm, and weight thereof is about 300 g. Accordingly, the mobile PC 16 can be held in pocket of the work clothing of the worker, holster to be attached to a belt, or a shoulder case, and is wearable. Although the mobile PC 16 incorporates therein semiconductor chips such as the CPU, semiconductor memory, and the like, and storage devices such as a Solid State Disk (SSD), and the like, the mobile PC 16 is not provided with a display device and hardware keyboard for input of characters.

On the front surface of the mobile PC 16, five buttons 202 constituted of an up button 202a, right button 202b, down button 202c, left button 202d, and decision button 202e (also called a center button or enter button) are arranged, and fingerprint sensor 204 is arranged below the five buttons 202. The mobile PC 16 is not provided with a hardware keyboard for input of characters, and a password number (also called a PIN) cannot be input. Therefore, the fingerprint sensor 204 is used for user authentication at the time of login of the mobile PC 16. The five buttons 202 can input a command.

User authentication at the time of login may be carried out by allocating numeric characters to the buttons 202a to 202d of the five buttons 202, and inputting a password number by using the five buttons 202. In this case, the fingerprint sensor 204 can be omitted. Numeric characters are allocated to the four buttons other than the decision button 202e, and the number of the numeric characters is only four. Thus, there is a possibility of numeric characters input in a random manner being coincident with the password number. However, by making the digit number of the password number large, it is possible to make the probability that the numeric characters input in a random manner will be coincident with the password number low. Authentication by the five buttons 202 may be enabled in also a mobile PC 16 provided with a fingerprint sensor 204. Although one mobile PC 16 may be shared among a plurality of workers, it is not possible to cope with such a case by only the fingerprint authentication.

The operations identical to those of the buttons 102, 104, 106, and 108, and touch pad 110 of the wearable device main body 24 can also be applied to the five buttons 202. The worker cannot watch the state where the buttons 102, 104, 106, and 108, and touch pad 110 of the wearable device main body 24 are being operated. Therefore, it may be necessary for a worker to become accustomed to carrying out an intended operation depending on the worker. Further, the buttons 102, 104, 106, and 108, and touch pad 110 are small in size, and thus they may be difficult to operate. In the embodiment, the five buttons 202 of the mobile PC 16 can also be operated in the same manner as above, and hence the above-mentioned fear can be dispelled. The operation procedures of the five buttons 202 are determined by the application program.

For example, when the decision button 202e is pressed once, item selection/item execution is carried out (corresponding to pressing once of the third button 106 in the wearable device main body 24), when the decision button 202e is pressed for a long time, ending or cancellation of an operation is carried out (corresponding to pressing once of the first button 102 in the wearable device main body 24), when the up button 202a is pressed once, the cursor is moved upward (corresponding to upward drag on the touch pad 110 in the wearable device main body 24), when the up button 202a is pressed for a long time, a list of activated application programs is displayed (corresponding to pressing the third button 106 for a long time in the wearable device main body 24), when the down button 202c is pressed once, the cursor is moved downward (corresponding to downward drag on the touch pad 110 in the wearable device main body 24), when the down button 202c is pressed for a long time, a menu of quick settings is displayed (corresponding to pressing of the second button 104 for a long time in the wearable device main body 24), when the left button 202d is pressed once, the right icon is selected (corresponding to backward drag/flick on the touch pad 110 in the wearable device main body 24), and when the right button 202b is pressed once, the left icon is selected (corresponding to forward drag/flick on the touch pad 110 in the wearable device main body 24).

On the upper side face of the mobile PC 16, a USB 3.0 connector 206, USB type-C connector 207, and audio jack 208 are provided.

On one side face (side face on the left side when viewed from the front) of the mobile PC 16, a memory card slot 218 for a memory card is provided. The memory card includes, for example, an SD card, micro SD card (registered trade mark), and the like.

On the other side face (side face on the right side when viewed from the front) of the mobile PC 16, a slot 210 for Kensington Lock (registered trade mark), power switch 212, power LED 213, DC IN/battery LED 214, DC terminal 216, and ventilation holes 222 for cooling are provided. The power LED 213 is arranged around the power switch 212, and turned on during the period of power-on. The DC IN/battery LED 214 indicates the state of the mobile PC 16 such as whether or not the battery is being charged, and remaining battery level. Although the mobile PC 16 can be driven by the battery, the mobile PC 16 can also be driven in the state where the AC adaptor is connected to the DC terminal 216. Although not shown, the back side of the mobile PC 16 is configured such that the battery can be replaced with a new one by a one-touch operation.

Figure 8:
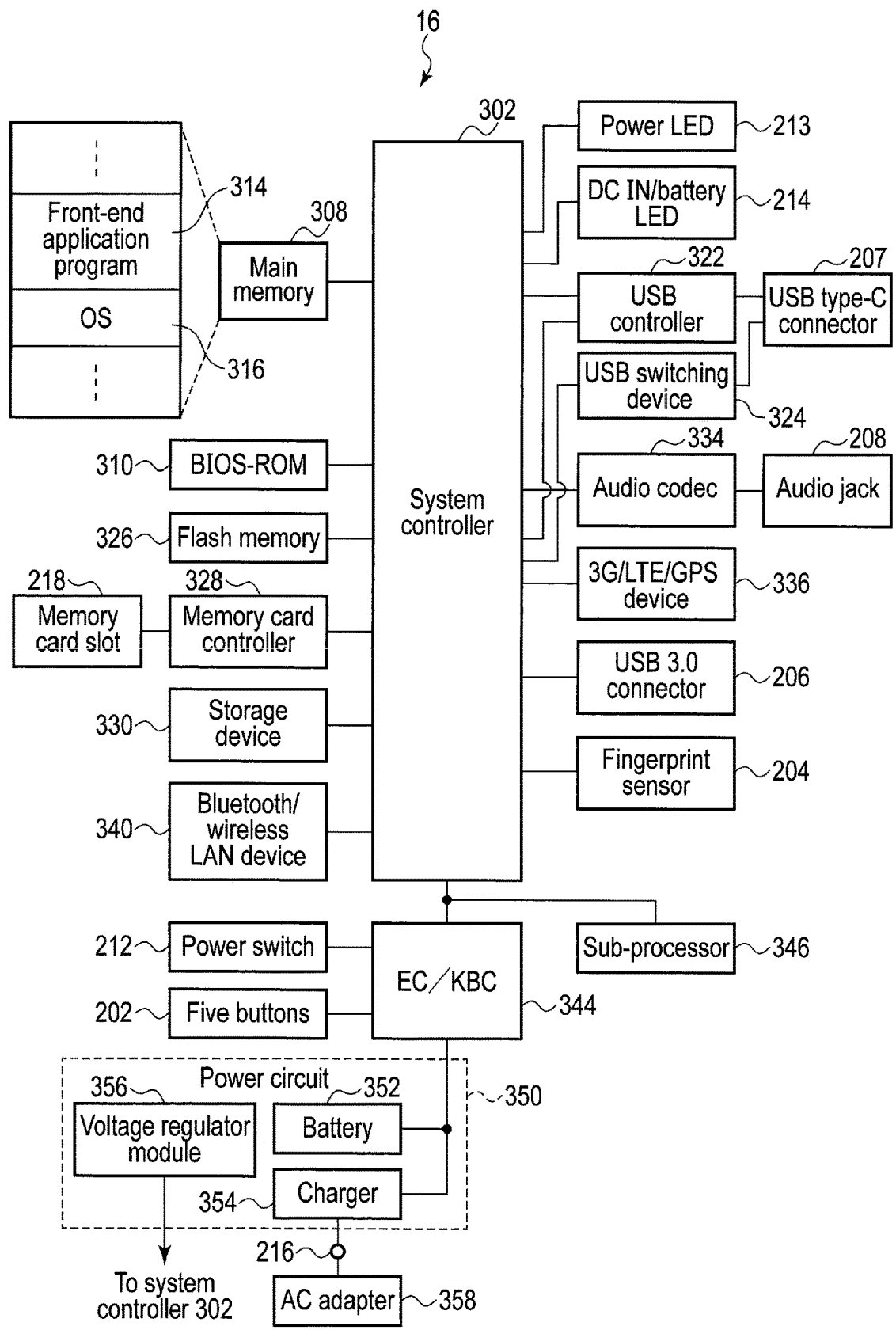
FIG. 8 is an example block diagram of the mobile PC.

FIG. 8 is a block diagram showing an exemplary structure of the mobile PC 16. The mobile PC 16 can carry out video distribution of an image shot by the wearable device main body 24 to the operator terminal 12, and enables browse of the image received from the operator terminal 12. For this reason, the mobile PC 16 is provided with a camera function and viewer function. The camera function is a function of shooting a photograph or video by means of the camera 116 of the wearable device main body 24. The shot photograph and video are stored in a camera folder (not shown) in the mobile PC 16, and can be browsed by the viewer function. The viewer function is a function of enabling browse of a file stored in the camera folder. The types of the files include image, moving image, PDF file, photograph and video shot by the camera function, image received from the operator terminal 12, image transmitted to the operator terminal 12, and file stored in a user folder (not shown) in the mobile PC 16.

The mobile PC 16 is provided with a system controller 302. The system controller 302 is constituted of a processor (CPU) and controller/hub. A main memory 308, the power LED 213, the DC IN/battery LED 214, and a USB controller 322 are connected to the processor of the system controller 302. A flash memory 326, A memory card controller 328 a storage constituted of an HDD or SSD, a USB switching device 324, an audio codec 334, a 3G/LTE/GPS device 336, the fingerprint sensor 204, the USB 3.0 connector 206, a Bluetooth/wireless LAN device 340, and an EC/KBC 344 are connected to the controller/hub of the system controller 302.

The system controller 302 executes various programs to be loaded from the storage device 330 into the main memory 308. These programs include an OS 316, and front-end application program 314 for remote support. The front-end application program 314 includes a screen direction control program.

The audio codec 334 converts a digital audio signal which is an object to be reproduced into an analog audio signal, and supplies the converted analog signal to the audio jack 208. Further, the audio codec 334 converts an analog audio signal input from the audio jack 208 into a digital signal.

The memory card controller 328 gains access to a memory card such as an SD card to be inserted into the memory card slot 218, and controls read/write of data from/to the SD card.

The USB controller 322 carries out control of transmission/reception of data to/from the USB type-C cable 146 (shown in FIG. 5) connected to the USB type-C connector 207 or the USB 3.0 cable (not shown) connected to the USB 3.0 connector 206.

Although not shown, a port extension adaptor including ports or connectors according to several interfaces can be connected also to the USB type-C connector 207, and an interface which is not provided in the mobile PC 16, such as the HDMI or the like, can be used.

The Bluetooth/wireless LAN device 340 executes wireless communication conforming to the Bluetooth/IEEE802.11 standard for the purpose of connection to the network 22. The connection to the network 22 may not depend on wireless communication, and may depend on wired LAN communication conforming to the IEEE802.3 standard.

The fingerprint sensor 204 is used for fingerprint authentication at the time of startup of the mobile PC 16.

A sub-processor 346, the power switch 212, and the five buttons 202 are connected to the EC/KBC 344. The EC/KBC 344 has a function of turning on or turning off the power to the mobile PC 16 according to the operation of the power switch 212. The control of power-on and power-off is executed by the cooperative operation of the EC/KBC 344 and power circuit 350. Even during a power-off period of the mobile PC 16, the EC/KBC 344 operates by the power from a battery 352 or AC adaptor 358 connected as an external power supply. The power circuit 350 uses the power from the battery 352 or AC adaptor 358 to thereby generate power to be supplied to each component. The power circuit 350 includes a voltage regulator module 356. The voltage regulator module 356 is connected to the processor in the system controller 302.

Although the mobile PC 16 is constituted as a body separate from the wearable device main body 24, the mobile PC 16 may be incorporated into the wearable device main body 24, and both of them may also be integrated into one body.

[Character Input Control]

As described above referring to FIG. 7, the mobile PC 16 includes the fingerprint sensor 204 for use in user authentication during a login procedure. User authentication in a login procedure may also be performed using the buttons 202a to 202e of the five-button unit 202 to input the password.

If the buttons 202a to 202e of the five-button unit 202 are used to input a password for user authentication in a login procedure, and if a number is assigned to each of the buttons 202a to 202d of the five-button unit 202, a combination of four numbers can only be input as the password, and thus the level of security is limited.

Accordingly, the wearable device 23 of this embodiment provides control so that a small number of buttons, such as the buttons 202a to 202e of the five-button unit 202, provide a key input function comparable to that provided by a full keyboard. Note that inputting a password for user authentication in a login procedure is merely an example, and the technique of controlling so that a small number of buttons provide a key input function comparable to that provided by a full keyboard is applicable to diverse applications.

Figure 9:
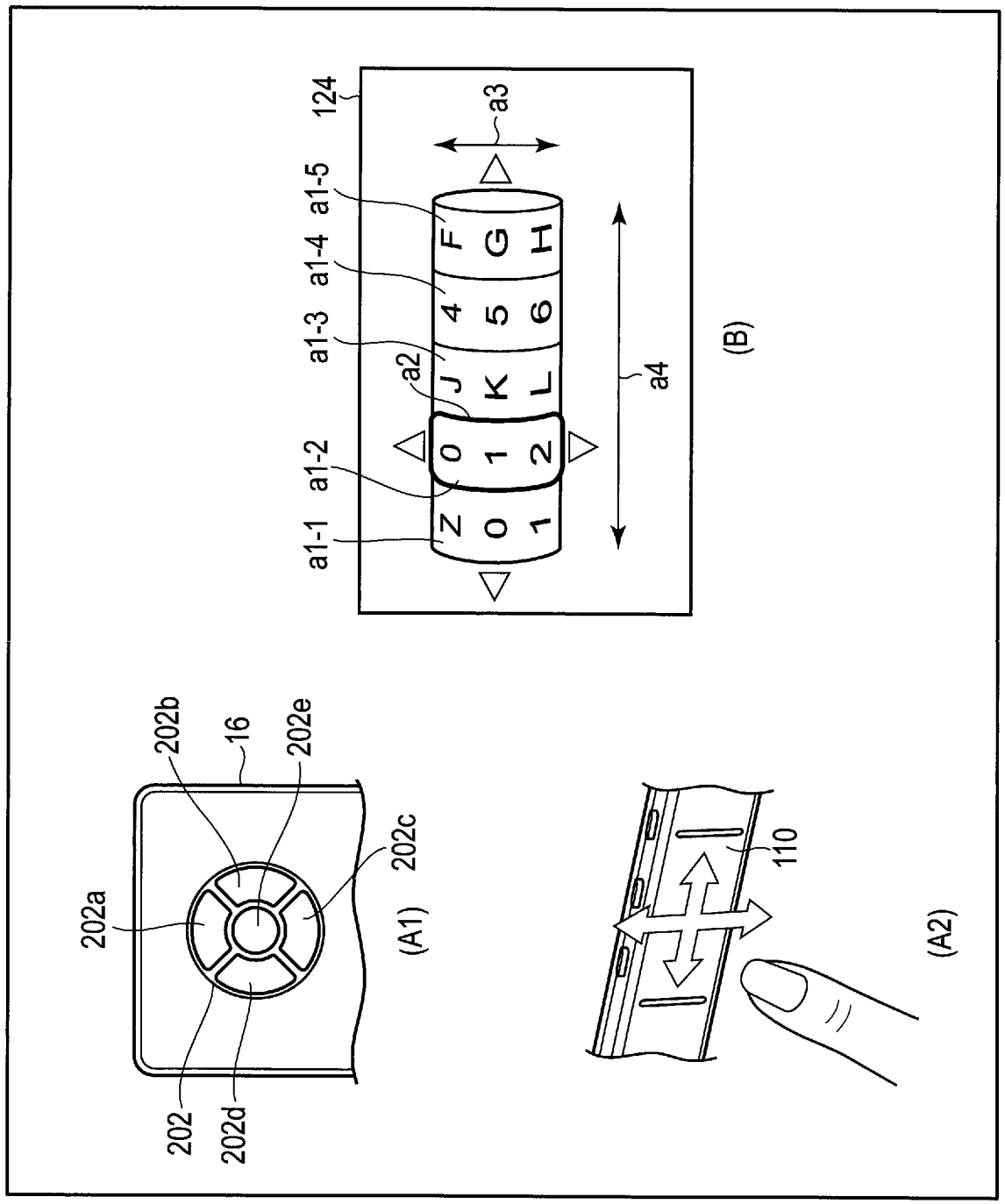
FIG. 9 is a view for explaining a password input screen and a password input operation using a small number of keys on the password input screen.

Referring to FIG. 9, an example according to this embodiment in which a password is input using, for example, the buttons 202a to 202e of the five-button unit 202, will be described below. Note that a password may also be input through a touch operation on the touchpad 110 of the wearable device main body 24 instead of using the five-button unit 202. In addition, as described above, a password may also be input using the buttons 102, 104, 106, and 108 of the wearable device main body 24, which allow the same set of operations as those that can be performed by the five-button unit 202.

It is assumed herein that a password formed of a five-digit/alphabetical letter string is input for user authentication in a login procedure. Displaying a password input screen on the display 124 and inputting the operation data generated by the operational person on the password input screen are controlled by the mobile PC 16 by executing the front-end application program 314, or otherwise, may be controlled by the mobile PC 16 by running the OS 316 or a BIOS not illustrated in FIG. 8. In other words, displaying a password input screen on the display 124 of the wearable device 23, and refreshing the password input screen are controlled by the mobile PC 16.

In FIG. 9, (A1) specifically illustrates the region including the five-button unit 202 in a front center portion of the mobile PC 16. (A2) specifically illustrates the region including the touchpad 110 on the side portion of the wearable device main body 24. (B) illustrates the password input screen displayed, by the mobile PC 16, on the display 124 of the wearable device 23, more specifically, an example software keyboard for inputting a password.

The correspondence between user operations on the buttons 202a to 202e of the five-button unit 202 of the mobile PC 16 and touch operations on the touchpad 110 of the wearable device main body 24 will first be described.

As described above, the wearable device main body 24 may be attached to the right temple or to the left temple of the eyeglass frame 142. In a case in which the wearable device main body 24 is attached to the right temple of the eyeglass frame 142, the right end of the touchpad 110 is positioned in the forward direction along the line of sight of the operational person, while in a case in which the wearable device main body 24 is attached to the left temple of the eyeglass frame 142, the left end of the touchpad 110 is positioned in the forward direction along the line of sight of the operational person. It is assumed herein that a touch operation on the touchpad 110 in a direction of the line of sight of the operational person corresponds to use of the button 202b of the five-button unit 202, and a touch operation on the touchpad 110 in a direction opposite the direction of the line of sight of the operational person corresponds to use of the button 202d of the five-button unit 202. The side of the temple of the eyeglass frame 142 to which the wearable device main body 24 is attached (i.e., whether the left side or the right side) is determined by the mobile PC 16 based on a result, transmitted from the wearable device main body 24, of detection by the motion sensor 176, such as an acceleration/geomagnetic/gravity/gyro sensor, and/or the proximity sensor 178 of the wearable device main body 24. It is also assumed herein that a touch operation on the touchpad 110 in the upward direction or the downward direction of the operational person corresponds to use of the button 202a or the button 202c of the five-button unit 202 no matter to which of the left and right temples of the eyeglass frame 142 the wearable device main body 24 is attached. In addition, a touch operation on the touchpad 110 called "tap" or other similar term that gives a light blow with a finger on the touchpad 110 corresponds to use of the button 202e of the five-button unit 202.

Transition of the password input screen on the display 124 caused by a user operation using any of the buttons 202a to 202e of the five-button unit 202, or by a touch operation using the touchpad 110, will next be described. It is assumed here that a password is input using the buttons 202a to 202e of the five-button unit 202.

As illustrated in (B) of FIG. 9, the password input screen for inputting a password formed of a five-digit/alphabetical letter string displays horizontally-arranged five objects (a1-n; i.e., a1-1 to a1-5) of rotatable virtual cylinders each having, on the cylindrical surface thereof, digits and alphabetical letters cyclically one by one, one of which can be selected. For example, an object a1-n displays digits and alphabetical letters (hereinafter referred to collectively as "characters") in ascending numerical order and then in alphabetical order such that the digits 0 to 9 are followed by the alphabetical letters A to Z, and the characters returns from the alphabetical letter Z to the digit 0. The characters may be arranged in the opposite order. Other symbols (e.g., "α, β, γ, . . . ," in ascending symbolic order) may be added to these characters. Alternatively, only either the digits or the alphabetical letters may be displayed.

The password input screen also displays an object a2 (in (B) of FIG. 9) indicating which one of the five digits is being input. That is, the mobile PC 16 according to this embodiment forms a software keyboard by a combination of the objects a1-n and the object a2. In other words, the mobile PC 16 displays the password input screen including such software keyboard on the display 124 of the wearable device 23.

In response to a user operation on the button 202a or on the button 202c of the five-button unit 202, the mobile PC 16 rotates the currently active object a1-n in an upward direction or a downward direction to change the character to select (hereinafter referred to as "selecting character"). For example, when the object a2 is presented to indicate the object a1-2 that represents "1" as the selecting character (located at a center position in the object a2), then in response to a user operation on the button 202a of the five-button unit 202, the mobile PC 16 changes the password input screen so that the object a1-2 rotates in the upward direction, that is, so that the object a1-2 now represents "2" as the selecting character (located at a center position in the object a2). In contrast, in response to a user operation on the button 202c of the five-button unit 202, the mobile PC 16 change the password input screen so that the object a1-2 rotates in the downward direction, that is, so that the object a1-2 now represents "0" as the selecting character (located at a center position in the object a2).

The mobile PC 16 displays each of the objects a1-n so that, in addition to the selecting character (located at a center position in the object a2), the selection candidate characters immediately before and after the selecting character appear to sandwich (i.e., respectively above and below the selecting character) the selecting character. More specifically, the next descending candidate character (i.e., the next candidate character in descending order), such as "0" for "1", is displayed above the selecting character, and the next ascending candidate character (i.e., the next candidate character in ascending order), such as "2" for "1", is displayed below the selecting character. This configuration enables the user to know in which direction to rotate the object a1-n to specify the user's intended character as the selecting character.

In addition, in response to a user operation on the button 202b of the five-button unit 202, the mobile PC 16 changes the password input screen so that the object a2 shifts to right, that is, so that the object a2 now indicates the object a1-3 instead of the object a1-2. In response to a user operation on the button 202d of the five-button unit 202, the mobile PC 16 changes the password input screen so that the object a2 shifts to left, that is, so that the object a2 now indicates the object a1-1 instead of the object a1-2.

In response to a user operation on the button 202e of the five-button unit 202, the mobile PC 16 accepts the five-character string represented by the objects a1-n (five characters located at each center position in a1-1-a1-5, e.g., "01K5G" in (B) of FIG. 9) as the input password. If the password that has been input is a correct password, the mobile PC 16 successfully completes the user authentication, and then performs a login procedure. Otherwise, if the password that has been input is incorrect, the mobile PC 16 displays the password input screen on the display 124 to prompt the user to re-enter the password. If the number of repetition of authentication trials reaches a threshold value, the mobile PC 16 ensures the security by locking the system so that the mobile PC 16 is no more usable unless personnel such as a system administrator performs a predetermined unlock procedure.

As described above, in this embodiment, a vertical direction specification operation using, for example, the button 202a or 202c of the five-button unit 202 enables one of the digits or alphabetical letters to be specified (direction a3 in (B) of FIG. 9), while a horizontal direction specification operation using, for example, the button 202b or 202d of the five-button unit 202 enables the currently active input position to be moved (direction a4 in (B) of FIG. 9). Thus, even a complex password formed of a combination of digits and/or alphabetical letters can be readily input.

Figure 10:
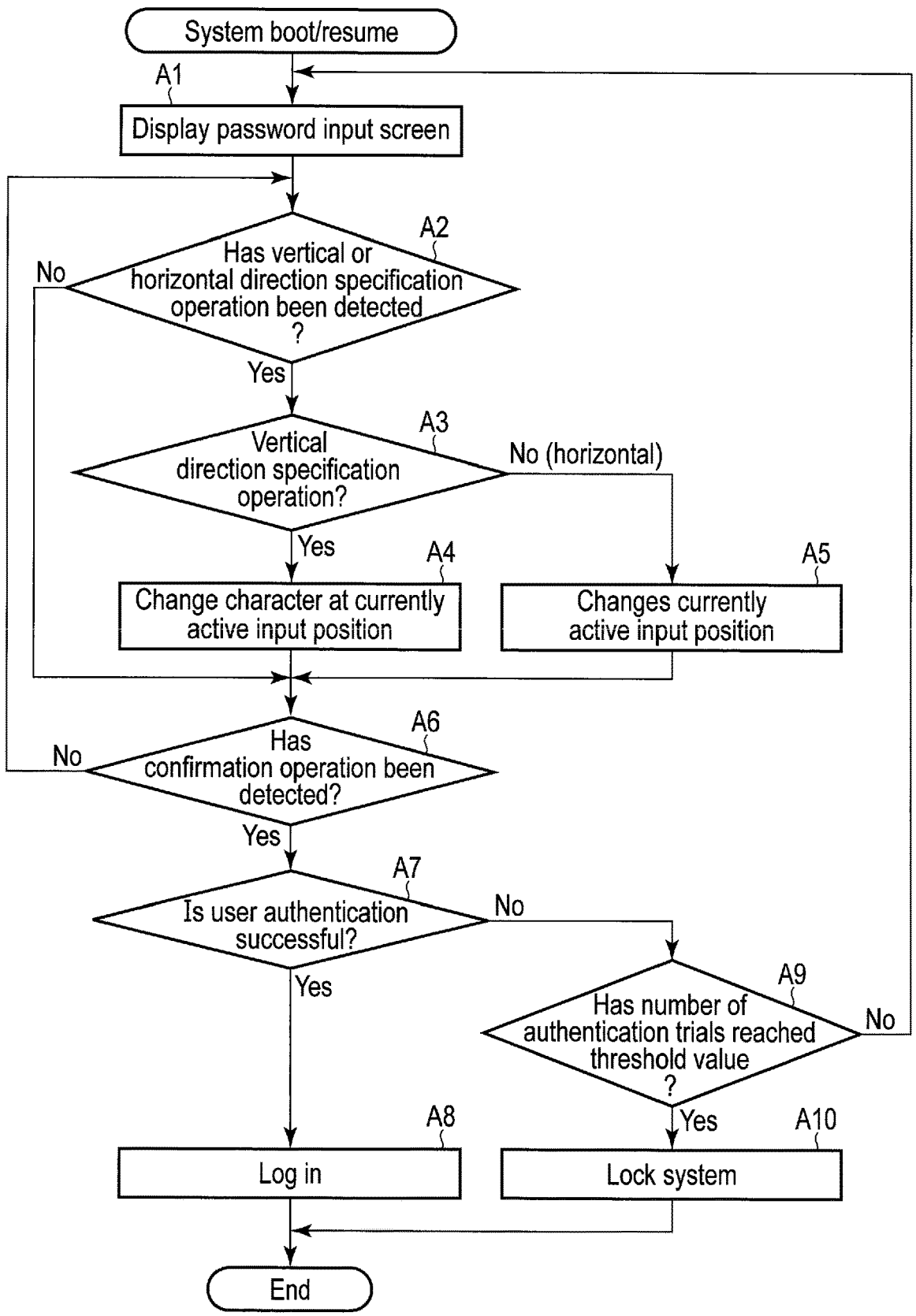
FIG. 10 is a flowchart showing an example of password input control process using a small number of keys provided by the mobile PC.

FIG. 10 is a flowchart showing an example of password input control process using, for example, the buttons 202a to 202e of the five-button unit 202 performed by the mobile PC 16.

During booting or resuming of the system of the mobile PC 16, the mobile PC 16 displays a password input screen for inputting a password on the display 124 of the wearable device 23 (step A1). Upon detection of a vertical direction specification operation using, for example, the button 202a or 202c of the five-button unit 202 (step A2: YES, and step A3: YES), the mobile PC 16 changes the character at the currently active input position (step A4). Otherwise, upon detection of a horizontal direction specification operation using, for example, the button 202b or 202d of the five-button unit 202 (Step A3: NO), the mobile PC 16 changes the currently active input position (step A5).

If no confirmation operation using, for example, the button 202e of the five-button unit 202 is detected (step A6: NO), the mobile PC 16 repeats the process from step A2 to step A5. If a confirmation operation is detected (step A6: YES), the mobile PC 16 accepts at that time point the string of the characters selected (each character located at a center position) at the respective currently active input positions as the input password, and determines whether the user authentication is successful based on the correctness of the input password (step A7). If the user authentication is successful (step A7: YES), the mobile PC 16 performs a login procedure (step A8).

Otherwise, if the user authentication fails (step A7: NO), the mobile PC 16 checks whether the number of repetition of authentication trials has reached a threshold value (step A9). If the number of repetition of authentication trials has not yet reached the threshold value (step A9: NO), the process returns to step A1, and the mobile PC 16 displays again the password input screen on the display 124 of the wearable device 23 to prompt the user to re-enter the password. If the number of repetition of authentication trials has reached the threshold value (step A9: YES), the mobile PC 16 ensures the security by locking the system so that the mobile PC 16 is no more usable unless personnel such as a system administrator performs a predetermined unlock procedure (step A10).

As described above, the mobile PC 16 of this embodiment enables the user to smoothly input a character string, such as a password, using a small number of buttons, such as the buttons 202a to 202e of the five-button unit 202.

The foregoing description has assumed that displaying a password input screen on the display 124 of the wearable device 23, and moving the password input position on the password input screen by means of the buttons 202a to 202e of the five-button unit 202 etc., are controlled by the mobile PC 16. However, an integrated wearable device may be configured to perform similar control to the control described above.

The process of this embodiment can be implemented by computer program instructions. Therefore, inventive advantages similar to those provided by this embodiment can be readily provided by installing a computer program including such computer program instructions to a computer using a computer-readable storage medium storing the computer program, and causing the computer to execute the computer program.

While certain embodiments have been embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wearable device comprising a display and an operation device, the wearable device comprising:
a character input controller that displays a software keyboard on the display, and controls input of a character in response to an operation for the software keyboard using the operation device,
wherein:
the character input controller;
displays the software keyboard comprising a set of input areas, each input area of the set comprising objects each representing a character, the set of input areas being arranged adjacent to one another in a first direction;
moves an active input area among the set of input areas in the first direction or in a second direction opposite to the first direction, in response to a first operation specifying the first direction or a second operation specifying the second direction; and
changes a character of an active object displayed in the active input area into another character in the active input area, in response to a third operation specifying a third direction perpendicular to the first direction or a fourth operation specifying a fourth direction opposite to the third direction;
the wearable device further comprises a front part to be positioned on a line of sight of an eyeball when the wearable device is worn on a face or a head, and
the display is provided on an inside surface of the front part so as to be views by the eyeball.

2. The wearable device of claim 1, wherein
characters of objects displayed in each input area of the set comprise at least one of a numerical digit, an alphabetical letter, or a symbol, and
the character input controller cyclically changes the character of the active object displayed in the active input area to another character in the active input area, based on at least one of ascending numerical order, alphabetical order, or ascending symbolic order, in response to the third operation or the fourth operation.

3. The wearable device of claim 2, wherein the character input controller
displays at least first, second and third characters on the display in each input area of the set of input areas,
the first character is displayed as the active object in the active input area,
the second character represents a next ascending candidate character displayed in the fourth direction below the first character, and
the third character represents a next descending candidate character displayed in the third direction above the first character.

4. The wearable device of claim 3, wherein the character input controller
changes the character of the active object displayed in the active input area into one of the next ascending candidate character or the next descending candidate character, in response to the third operation, and
changes the character of the active object displayed in the active input area into the other of the next ascending candidate character or the next descending candidate character, in response to the fourth operation.

5. The wearable device of claim 4, wherein the character input controller
displays the one of the next ascending candidate character or the next descending candidate character in the third direction above the active object displayed in the active input area, and
displays the other of the next ascending candidate character or the next descending candidate character in the fourth direction below the active object displayed in the active input area.

6. The wearable device of claim 1, wherein
the character input controller displays the software keyboard on the display to input a password for user authentication.

7. The wearable device of claim 1, further comprising a side part to be along a temple, and the operation device is provided on an outside surface of the side part.

8. The wearable device of claim 1, further comprising a glasses frame, a helmet, or goggles, and the display and the operation device are attached to the glasses frame, the helmet, or the goggles.

* * * * *